US006785149B2

(12) United States Patent
Gilliland et al.

(10) Patent No.: US 6,785,149 B2
(45) Date of Patent: Aug. 31, 2004

(54) ELECTRONIC MODULES

(75) Inventors: Douglas G. Gilliland, Santa Ana, CA (US); Donald J. Glaser, Huntington Beach, CA (US); Dennis Patrick Miller, Fullerton, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/230,123

(22) Filed: Aug. 28, 2002

(65) Prior Publication Data
US 2004/0042191 A1 Mar. 4, 2004

(51) Int. Cl.[7] .................................................. H05K 7/14
(52) U.S. Cl. ...................... 361/796; 361/788; 361/730; 361/752; 174/50; 211/41.17
(58) Field of Search ................................ 361/730, 728, 361/752, 788, 826, 796; 174/50; 211/41.17

(56) References Cited

U.S. PATENT DOCUMENTS

| | | | | |
|---|---|---|---|---|
| 5,122,691 A | * | 6/1992 | Balakrishnan | ............... 307/475 |
| 5,262,923 A | * | 11/1993 | Batta et al. | ................. 361/685 |
| 5,546,282 A | * | 8/1996 | Hill et al. | ................... 361/796 |
| 6,108,345 A | * | 8/2000 | Zhang et al. | ................ 370/445 |
| 6,115,755 A | * | 9/2000 | Krishan | ...................... 709/250 |
| 6,144,561 A | * | 11/2000 | Cannella, Jr. et al. | ...... 361/796 |
| 6,195,493 B1 | * | 2/2001 | Bridges | ...................... 385/134 |
| 6,356,444 B1 | * | 3/2002 | Pedoeem | .................... 361/692 |
| 2003/0083062 A1 | * | 5/2003 | Bartholome et al. | ........ 455/426 |

* cited by examiner

*Primary Examiner*—David Martin
*Assistant Examiner*—Dameon E. Levi
(74) *Attorney, Agent, or Firm*—Fogg and Associates, LLC; Jon M. Powers

(57) ABSTRACT

An electronic module having a chassis and a single backplane disposed within the chassis. A plurality of bridge circuit cards is disposed within the chassis and is electrically connected to the single backplane. Each of the plurality of bridge circuit cards is for converting between a local area network protocol and a wide area network protocol. A hub circuit card is disposed within the chassis and is electrically connected to the single backplane so that the hub circuit card is electrically connected to each of the plurality of bridge circuit cards. The single backplane is connectable to each of a plurality of remote units for respectively electrically connecting each of the plurality of remote units to each of the plurality of bridge circuit cards. The single backplane is connectable to a data network for electrically connecting the data network to the hub circuit card.

22 Claims, 2 Drawing Sheets

ELECTRONIC MODULES

TECHNICAL FIELD

The present invention relates generally to the field of electronic modules and, in particular, to electronic modules for connecting a data network to a plurality of remote units.

BACKGROUND

Many central offices communicate with data networks, such as the Internet, using a local area network (LAN) protocol, such as Ethernet or the like. These central offices also communicate with remote units (or huts) using a wide area network (WAN) protocol, such as high speed DSL (digital subscriber link) (HDSL) or the like. The huts are connected to a number of subscribers and enable the subscribers to communicate with the data network.

Typically, the data network is connected to a router located in the central office using a LAN connection, such as an Ethernet connection. The router is connected to a central connecting device (or hub) located in the central office by a LAN connection and routes digital data packets between the data network and the hub. A plurality of bridge modules located in the central office is connected to the hub by a number of LAN connections. In particular, the hub has several LAN ports, each of which is respectively connected to a LAN port of each of the bridge modules. The hub sends digital data packets to and receives digital data packets from each of the bridge modules. Each of the bridge modules has a WAN port, such as a T1/E1, T3/E3, DSL port or the like. Each bridge module bridges the data packets between the WAN and LAN ports of the respective bridge module and converts between the LAN and WAN protocols. The WAN port of a bridge module is connected to a hut by a WAN connection, e.g., T1/E1, T3/E3, DSL connection or the like for transferring the data packets between the hut and the bridge module.

Each bridge module normally includes a chassis with a single backplane located within the chassis and single bridge circuit card within the chassis electrically connected to the single backplane. In many applications, bridge modules are located in electronics racks in the central office so that the bridge circuit card is horizontal. For applications where several LAN ports of a hub are connected to each of plurality bridge modules, the bridge modules are stacked vertically one above another within an electronics rack. In this arrangement, each bridge module spans the width of the rack and occupies a vertical space in the rack. Therefore, the stack of bridge modules occupies a plurality of vertical spaces. This can be costly when renting rack space within a central office.

For the reasons stated above, and for other reasons stated below that will become apparent to those skilled in the art upon reading and understanding the present specification, there is a need in the art for reducing rack space consumed by a plurality of bridge modules.

SUMMARY

The above-mentioned problems with rack space consumed by a plurality of bridge modules and other problems are addressed by embodiments of the present invention and will be understood by reading and studying the following specification.

One embodiment provides an electronic module for connecting a data network to a plurality of remote units, the electronic module having a chassis and a single backplane disposed within the chassis. A plurality of bridge circuit cards is disposed within the chassis and is electrically connected to the single backplane. Each of the plurality of bridge circuit cards is for converting between a local area network protocol and a wide area network protocol. A hub circuit card is disposed within the chassis and is electrically connected to the single backplane so that the hub circuit card is electrically connected to each of the plurality of bridge circuit cards. The single backplane is connectable to each of the plurality of remote units for respectively electrically connecting each of the plurality of remote units to each of the plurality of bridge circuit cards. The single backplane is connectable to the data network for electrically connecting the data network to the hub circuit card.

Further embodiments of the invention include methods and apparatus of varying scope.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide electronic modules for connecting a data network to a plurality of remote units. In one embodiment, an electronic module includes a plurality of bridge circuit cards and a hub circuit card connected to a single backplane of the module. In another embodiment, the bridge circuit cards and the hub circuit card are oriented vertically and disposed laterally within the module so as to span a width of an electronics rack when the module is disposed within the electronics rack. This enables a larger number of bridge circuit cards to occupy a given vertical rack space compared to when a bridge card is disposed horizontally within a single bridge module that spans the width of the rack, and a number of these modules are stacked vertically within the rack.

Figure 1:
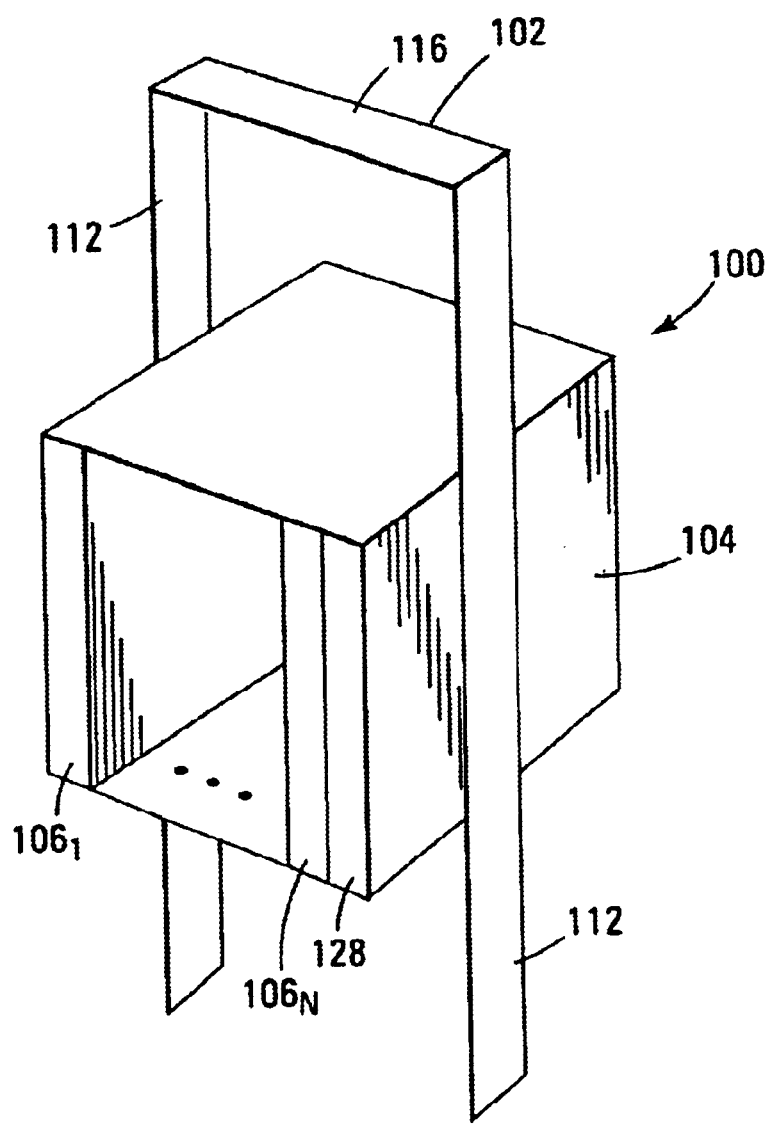
FIG. 1 is an isometric view illustrating an electronic module disposed in an electronics rack according to an embodiment of the present invention.

FIG. 1 is an isometric view illustrating an electronic module 100 disposed in an electronics rack 102, e.g., located in a central office of a telecommunications system, according to an embodiment of the present invention. Electronics rack 102 includes side rails 112 separated by a top rail 116. Electronic module 100 includes a chassis 104 disposed between side rails 112. In one embodiment, bridge circuit cards $106_1$ to $106_N$ and a central connecting (or hub) circuit card 128 are disposed laterally within chassis 104 so as to span a horizontal distance (or a width) between side rails 112. In another embodiment, bridge circuit cards $106_1$ to $106_N$ and hub circuit card 128 are disposed within chassis 104 so that they are substantially parallel to side rails 112. In other embodiments, side rails 112, bridge circuit cards $106_1$ to $106_N$, and hub circuit card 128 are substantially vertical, as shown.

In some embodiments, bridge circuit cards $106_1$ to $106_N$ convert between a LAN protocol, e.g., Ethernet, and a WAN protocol, e.g., HDSL or the like. In another embodiment, bridge circuit cards $106_1$ to $106_N$ are UMG 319 gate cards available from ADC Telecommunications, Inc., Eden Prairie, Minn. In other embodiments, hub circuit card 128 is a UMH 319 hub card available from ADC Telecommunications, Inc., Eden Prairie, Minn.

Figure 2:
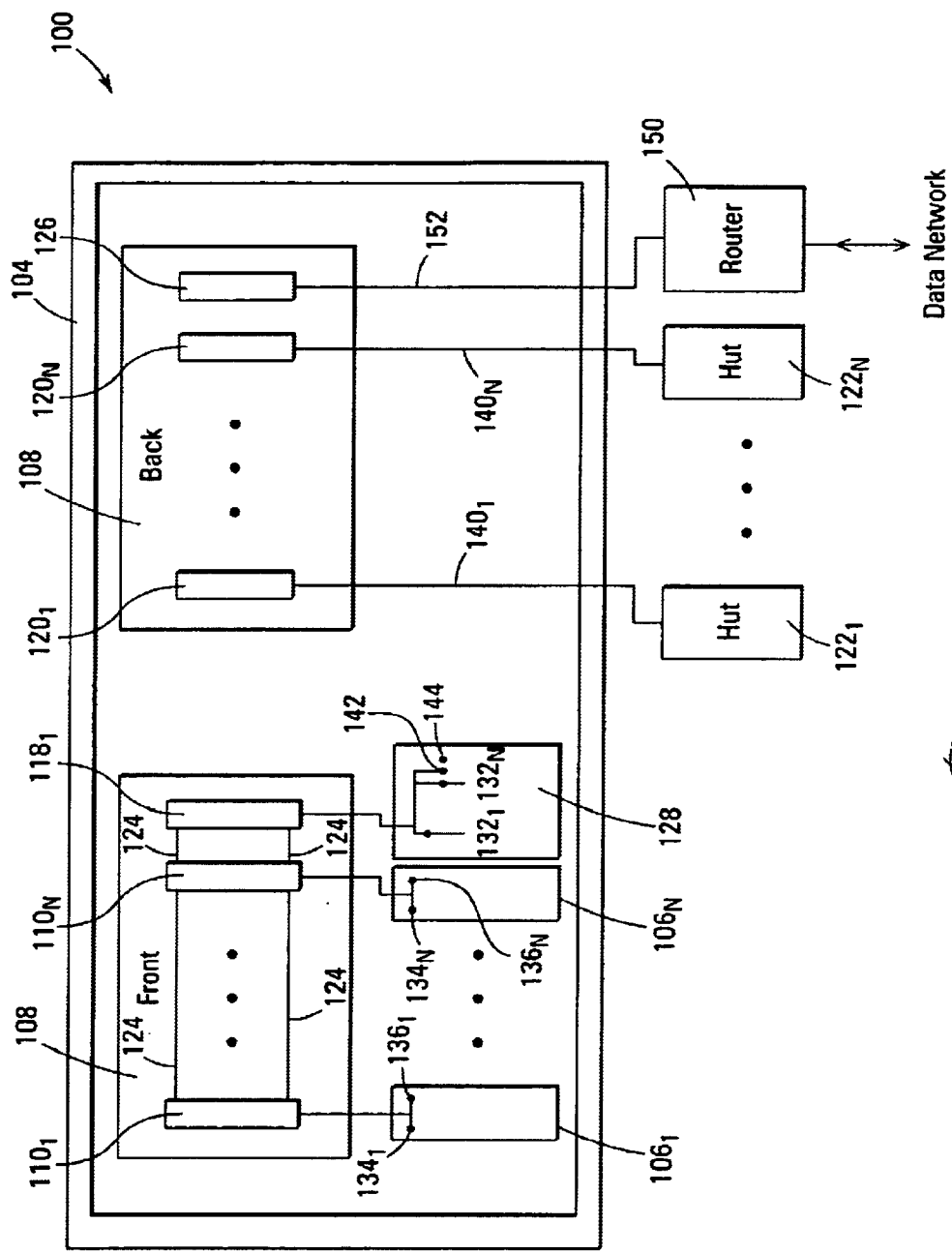
FIG. 2 is a block diagram illustrating the electronic module of FIG. 1.

FIG. 2 is a block diagram illustrating electronic module 100. Electronic module 100 includes a backplane 108 disposed within chassis 104. Bridge circuit cards $106_1$ to $106_N$ are electrically connected to backplane 108 by respectively plugging into connectors $110_1$ to $110_N$ disposed on a front of backplane 108. Hub circuit card 128 is plugged into a connector 118 disposed on the front of backplane 108. Traces 124 disposed within or on backplane 108 electrically connect connector 118 to connectors $110_1$ to $110_N$, as shown in FIG. 2. This connects ports $132_1$ to $132_N$, such as LAN ports, e.g., Ethernet, of hub circuit card 128 respectively to ports $134_1$ to $134_N$, such as LAN ports, respectively of bridge circuit cards $106_1$ to $106_N$ for transferring digital data packets respectively between ports $132_1$ to $132_N$ and ports $134_1$ to $134_N$ using a LAN protocol, such as Ethernet. In one embodiment, connectors $110_1$ to $110_N$ are 2 mm Hard Metric connectors available from Amp, a TYCO International Ltd. Company, Inc., Stoney Creek, Alberta, Canada.

Connectors $110_1$ to $110_N$ are respectively connected to connectors $120_1$ to $120_N$ disposed on a back of backplane 108, by electrically conducting traces (not shown) passing through backplane 108. This connects connectors $120_1$ to $120_N$ respectively to ports $136_1$ to $136_N$, such as WAN ports, e.g., T1/E1, T3/E3, DSL, etc., respectively of bridge circuit cards $106_1$ to $106_N$. Connectors $120_1$ to $120_N$ are respectively electrically connectable to remote units (or huts) $122_1$ to $122_N$, e.g., by cables $140_1$ to $140_N$. In one embodiment, cables $140_1$ to $140_N$ provide WAN connections, such as T1/E1, T3/E3, DSL, etc., for transferring digital data packets respectively between ports $136_1$ to $136_N$ and huts $122_1$ to $122_N$ using a WAN protocol, such as high speed DSL (HDSL). In another embodiment, connectors $120_1$ to $120_N$ include posts that are connectable to cables $140_1$ to $140_N$ by wire wrapping.

A connector 126, e.g., an RJ 48 connector, disposed on the back of backplane 108 is connected to connector 118 using a traces (not shown) passing through backplane 108. A router 150 is electrically connectable to connector 126 by a cable 152, such as an Ethernet cable, so as to connect router 140 to a router port 142 of hub 128 via connecter 124 and cable 130. Router 150 routes digital data packets, e.g., from a data network, such as the Internet, to router port 142 using a LAN protocol, such as Ethernet.

In one embodiment, hub circuit card 128 has a craft port 144, such as an RS-232 port. In this embodiment, a personal computer, an emulation terminal, or the like is connected to craft port 144 to monitor and/or alter the operation of hub circuit card 128.

Conclusion

Embodiments of the present invention have been described. The embodiments provide electronic modules for connecting a data network to a plurality of remote units. In one embodiment, an electronic module includes a plurality of bridge circuit cards and a hub circuit card connected to a single backplane of the module. In another embodiment, the bridge circuit cards and a hub circuit card are disposed laterally within the module so as to span a horizontal distance across an electronics rack when the module is disposed within the electronics rack. This reduces the amount of rack space occupied by the plurality of bridge circuit cards compared to when a plurality of bridge modules, each having a single bridge circuit card, are stacked vertically above each other within an electronics rack.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. It is manifestly intended that this invention be limited only by the following claims and equivalents thereof.

What is claimed is:

1. An electronic module for connecting a data network to a plurality of remote units, the electronic module comprising:

a chassis;

a single backplane disposed within the chassis;

a plurality of bridge circuit cards disposed within the chassis and electrically connected to the single backplane, wherein each of the plurality of bridge circuit cards converts between a local area network protocol and a wide area network protocol; and a hub circuit card disposed within the chassis and electrically connected to the single backplane so that the hub circuit card is electrically connected to each of the plurality of bridge circuit cards via the single backplane;

wherein when the single backplane is connected to each of the plurality of remote units, each of the plurality of remote units is respectively electrically connected to each of the plurality of bridge circuit cards; and wherein when the single backplane is connected to the data network, the data network is electrically connected to the hub circuit card.

2. The electronic module of claim 1, wherein the single backplane connects each of a plurality of ports of the hub circuit card respectively to a port of each of the plurality of bridge circuit cards.

3. The electronic module of claim 1, wherein the single backplane connects a port of each of the plurality of bridge circuit cards respectively to each of the plurality of remote units when the single backplane is connected to each of the plurality of remote units.

4. The electronic module of claim 1, wherein the single backplane connects a port of the hub circuit card to a router that is connected to the data network when the single backplane is connected to the data network.

5. The electronic module of claim 1, further comprising a plurality of connectors disposed on the single backplane that respectively electrically connect each of the plurality of bridge circuit cards to the single backplane.

6. The electronic module of claim 1, further comprising a connector disposed on the single backplane that electrically connects the hub circuit card to the single backplane.

7. The electronic module of claim 1, further comprising a connector disposed on the single backplane that electrically connects the hub circuit card to the data network via the backplane when the single backplane is connected to the data network.

8. The electronic module of claim 1, further comprising a plurality of connectors disposed on the single backplane that respectively electrically connects each of the plurality of bridge circuit cards to each of the plurality of remote units via the single backplane when the single backplane is connected to each of the plurality of remote units.

9. A central office electronic module for connecting a data network to a plurality of remote units, the central office electronic module comprising:

a chassis;

a single backplane disposed within the chassis;

a plurality of bridge circuit cards disposed within the chassis and electrically connected to the single backplane, wherein each of the plurality of bridge circuit cards converts between a local area network protocol and a wide area network protocol; and a hub circuit card disposed within the chassis and electrically connected to the single backplane so that each of a plurality of first local access network ports of the hub circuit card is respectively electrically connected to a local access network port of each of the plurality of bridge circuit cards;

wherein the single backplane connects a wide access network port of each of the plurality of bridge circuit cards respectively to each of the plurality of remote units when the single backplane is connected to the plurality of remote units; and wherein when the single backplane is connected to the data network, the data network is electrically connected to the hub circuit card.

10. The central office electronic module of claim 9, wherein the single backplane connects a second local access network part of the hub circuit card to a router that is connected to the data network when the single backplane is connected to the data network.

11. A central office electronic module for connecting a data network to a plurality of remote units, the central office electronic module comprising:

a chassis;

a single backplane disposed within the chassis;

a plurality of first connectors disposed on a first surface of the single backplane;

a plurality of bridge circuit cards disposed within the chassis and respectively electrically connected to the single backplane via each of the plurality of first connectors, wherein each of the plurality of bridge circuit cards converts between a local area network protocol and a wide area network protocol;

a plurality of second connectors disposed on a second surface of the single backplane, each of the plurality of second connectors respectively electrically connected to each of the plurality of first connectors and thus each of the plurality of bridge circuit cards via the single backplane, each of the plurality of second connectors respectively connected to each of the plurality remote units for respectively electrically connecting a wide area network port of each of the plurality of bridge circuit cards to each of the plurality remote units when the single backplane is connected to the plurality of remote units;

a third connector disposed on the first surface of the single backplane and electrically connected to each of the plurality of first connectors and thus each of the plurality of bridge circuit cards via the single backplane;

a hub circuit card disposed within the chassis and electrically connected to the single backplane via the third connector so that each of a plurality of first local access network ports of the hub circuit card is respectively electrically connected to a local access network port of each of the plurality of bridge circuit cards; and a fourth connector disposed on the second surface of the single backplane and electrically connected to the third connector via the single backplane, wherein when the fourth connector is connected to the data network, a local access connection is provided between the hub circuit card and the data network.

12. A central office electronics rack comprising:

a pair side rails separated by a top rail;

a chassis disposed between the side rails;

a single backplane disposed within the chassis;

a plurality of bridge circuit cards disposed within the chassis and electrically connected to the single backplane, wherein each of the plurality of bridge circuit cards converts between a local area network protocol and a wide area network protocol; and a hub circuit card disposed within the chassis and electrically connected to the single backplane so that the hub circuit card is electrically connected to each of the plurality of bridge circuit cards;

wherein the plurality of bridge circuit cards and the hub circuit card are disposed laterally to span a horizontal distance between the side rails;

wherein when the single backplane is connected to each of a plurality of remote units, each of the plurality of remote units is respectively electrically connected to each of the plurality of bridge circuit cards; and wherein when the single backplane is connected to a data network, the data network electrically connects to the hub circuit card.

13. The central office electronics rack of claim 12, wherein the single backplane connects each of a plurality of ports of the hub circuit card respectively to a port of each of the plurality of bridge circuit cards.

14. The central office electronics rack of claim 12, wherein the single backplane connects a port of each of the plurality of bridge circuit cards respectively to each of the plurality of remote units when the single backplane is connected to each of the plurality of remote units.

15. The central office electronics rack of claim 12, wherein the single backplane connects a port of the hub circuit card to a router that is connected to the data network when the single backplane is connected to the data network.

16. A method for transferring data, the method comprising:

transferring the data between a first connector and a hub circuit card via a single backplane using a local area network protocol, wherein the single backplane is disposed in an electronic module, the first connector is disposed on the single backplane, and the hub circuit card is disposed within the electronic module and is electrically connected to the single backplane;

transferring the data between the hub circuit card and each of a plurality of bridge circuit cards via the single backplane using the local area network protocol, wherein the plurality of bridge circuit cards is disposed within the electronic module and is electrically connected to the single backplane;

converting the data between the local access network protocol and a wide access network protocol at each of the plurality of bridge circuit cards; and respectively transferring the data between each of the plurality of bridge circuit cards and each of a plurality of second connectors via the single backplane using the wide access network protocol, wherein each of the plurality of second connectors is disposed on the single backplane.

17. The method of claim 16, further comprising transferring the data between a data network and the first connector using the local area network protocol.

18. The method of claim 16, further comprising respectively transferring the data between each of the plurality of second connectors and each of a plurality of remote units using the wide access network protocol.

19. A method for manufacturing an electronic module for connecting a data network to a plurality of remote units, the method comprising:

disposing a first connector on a single backplane, wherein the first connector provides a local area network connection between the single backplane and a data network when the single backplane is connected to the data network;

disposing a plurality of second connectors on the single backplane, wherein each of the plurality of second connectors respectively provides a wide area network connection between the single backplane and a each of a plurality of remote units when the single backplane is connected to the data network;

disposing the single backplane within a chassis;

disposing a hub circuit card within the chassis and electrically connecting the hub circuit card to the single backplane so as to electrically connect the hub circuit card to the first connector via the single backplane to form a local access network connection between the hub circuit card and the first connector; and disposing a plurality of bridge circuit cards within the chassis and electrically connecting each of the plurality of bridge circuit cards to the single backplane so as to respectively electrically connect each of the plurality of bridge circuit cards to each of the plurality of second connectors via the single backplane to respectively form a wide access network connection between each of the plurality of bridge circuit cards and each of the plurality of second connectors, wherein each of the plurality of bridge circuit cards converts from a local access network protocol to a wide access network protocol.

20. The method of claim 19, further comprising forming the chassis.

21. The method of claim 19, wherein electrically connecting the hub circuit card to the single backplane comprises disposing a third connector on the single backplane and plugging the hub circuit into the third connector.

22. The method of claim 19, wherein electrically connecting each of the plurality of bridge circuit cards to the single backplane comprises disposing a plurality of third connectors on the single backplane and respectively plugging each of the plurality of bridge circuit cards into each of the plurality of third connectors.

* * * * *